United States Patent
Weistrand

(10) Patent No.: US 9,373,173 B2
(45) Date of Patent: Jun. 21, 2016

(54) METHOD AND SYSTEM FOR ATLAS-BASED SEGMENTATION

(71) Applicant: RaySearch Laboratories AB, Stockholm (SE)

(72) Inventor: Ola Weistrand, Stockholm (SE)

(73) Assignee: RaySearch Laboratories AB, Stockholm (SE)

( * ) Notice: Subject to any disclaimer, the term of this patent is extended or adjusted under 35 U.S.C. 154(b) by 0 days.

(21) Appl. No.: 14/762,642

(22) PCT Filed: Dec. 2, 2013

(86) PCT No.: PCT/EP2013/075270
§ 371 (c)(1),
(2) Date: Jul. 22, 2015

(87) PCT Pub. No.: WO2014/206506
PCT Pub. Date: Dec. 31, 2014

(65) Prior Publication Data
US 2015/0363937 A1    Dec. 17, 2015

(30) Foreign Application Priority Data

Jun. 24, 2013 (EP) .................................... 13173421

(51) Int. Cl.
*G06K 9/00* (2006.01)
*G06T 7/00* (2006.01)

(52) U.S. Cl.
CPC ............ *G06T 7/0089* (2013.01); *G06T 7/0024* (2013.01); *G06T 7/0081* (2013.01); *G06T 2207/10081* (2013.01); *G06T 2207/10088* (2013.01); *G06T 2207/20016* (2013.01); *G06T 2207/20128* (2013.01); *G06T 2207/30004* (2013.01)

(58) Field of Classification Search
None
See application file for complete search history.

(56) References Cited

U.S. PATENT DOCUMENTS

| | | | | |
|---|---|---|---|---|
| 6,336,082 B1 * | 1/2002 | Nguyen | ............... | G06K 9/6255 340/658 |
| 2007/0047840 A1 | 3/2007 | Xu et al. | | |
| 2008/0039711 A1 * | 2/2008 | Feilkas | ................. | G06T 7/0024 600/410 |
| 2008/0118135 A1 * | 5/2008 | Averbuch | .............. | G06T 7/0012 382/131 |
| 2009/0060308 A1 * | 3/2009 | Dawant | ................. | G06T 7/0028 382/131 |
| 2009/0324012 A1 * | 12/2009 | Sun | ....................... | G06T 7/0083 382/103 |
| 2010/0266170 A1 | 10/2010 | Khamene et al. | | |

(Continued)

FOREIGN PATENT DOCUMENTS

DE    WO 2012025855 A1 *    3/2012    ............ G06T 11/008

OTHER PUBLICATIONS

"Segmentation of the Prostate in MR Images by Atlas Matching," S. Klein, et al, 4th IEEE International Symposium onBiomedical Imaging: From Nano to Macro, 2007. Year: 2007, pp. 1300-1303.*

(Continued)

*Primary Examiner* — Wenpeng Chen
(74) *Attorney, Agent, or Firm* — Drinker Biddle & Reath LLP

(57) ABSTRACT

A method for atlas-based segmentation is provided where a patient image is rigidly registered with each of a plurality of atlas images. Based on the rigid registration results, which indicate a degree of similarity for each atlas, an atlas image is selected for deformable registration where the rigid registration result is used as initialization. Regions of interest are segmented in the patient image using the results of the deformable registration.

13 Claims, 5 Drawing Sheets

(56) References Cited

U.S. PATENT DOCUMENTS

| | | | | |
|---|---|---|---|---|
| 2011/0179044 A1* | 7/2011 | Crum | ............ | G06K 9/342 707/749 |
| 2011/0216954 A1* | 9/2011 | Sundar | ............ | G06T 7/0024 382/131 |
| 2012/0027272 A1* | 2/2012 | Akinyemi | ............ | G06T 7/0081 382/128 |
| 2012/0219197 A1* | 8/2012 | Piper | ............ | A61B 6/507 382/131 |
| 2012/0314919 A1* | 12/2012 | Sparks | ............ | G06F 19/321 382/128 |
| 2013/0034203 A1* | 2/2013 | Wang | ............ | A61B 6/03 378/41 |
| 2013/0039550 A1* | 2/2013 | Blum | ............ | G06T 7/0014 382/128 |
| 2013/0322723 A1* | 12/2013 | Akhbardeh | ............ | A61B 6/032 382/131 |
| 2013/0322728 A1* | 12/2013 | Jacobs | ............ | A61B 5/055 382/132 |
| 2014/0056501 A1* | 2/2014 | Du | ............ | G06T 7/0081 382/131 |
| 2014/0161338 A1* | 6/2014 | Machado | ............ | A61B 5/0042 382/131 |
| 2014/0328527 A1* | 11/2014 | Zhou | ............ | G06K 9/66 382/131 |
| 2014/0341449 A1* | 11/2014 | Tizhoosh | ............ | G06T 7/0083 382/128 |
| 2015/0088225 A1* | 3/2015 | Noble | ............ | A61N 1/36032 607/57 |
| 2015/0254838 A1* | 9/2015 | Blumhofer | ............ | G06T 7/0024 382/131 |

OTHER PUBLICATIONS

"An Atlas-Based Segmentation Propagation Framework Using Locally Affine Registration—Application to Automatic Whole Heart Segmentation", X. Zhuang, et al, Proceedings of the 11th International Conference on Medical Image Computing and Computer-Assisted Intervention, Sep. 6-10, 2008.*

A. Asadulina et al., "Whole-body gene expression pattern registration in Platynereis larvae", Biomed Central Ltd., 2012, vol. 3:27, p. 1-p. 12.

E.M. van Rikxoort et al., "Adaptive local multi-atlas segmentation: Application to the heart and the caudate nucleus", Medical Image Analysis, 2009, p. 1-p. 11.

T. Rohlfing et al., "Segmentation of Three-Dimensional Images Using Non-Rigid Registration: Methods and Validation with Application to Confocal Microscopy Images of Bee Brains", Proceedings of SPIE, 2003, p. 1-p. 12.

F. Shi et al., "Neonatal brain image segmentation in longitudinal MRI studies", Neuroimage, Academic Press, 2010, vol. 49, p. 391-p. 400.

* cited by examiner

METHOD AND SYSTEM FOR ATLAS-BASED SEGMENTATION

CROSS REFERENCE TO RELATED APPLICATIONS

This application is a National Stage of International Application No. PCT/EP2013/075270 filed Dec. 2, 2013, which claims benefit of European Patent Application No. 13173421.2 filed Jun. 24, 2013, both of which are herein incorporated by reference in their entirety.

The present invention relates to image segmentation, and more specifically to atlas-based image segmentation of medical images.

BACKGROUND

Medical images, such as three-dimensional CT or MRI images, must sometimes be segmented. Segmentation of an image refers to the process of defining or reconstructing different internal structures, as well as a patient outline, in an image. The structures, or "Regions of Interest" (ROIs), could be for example specific internal organs identifiable in the images. Segmented ROIs are often represented as solid or translucent objects in the three-dimensional images so as to be viewable, and possibly also manipulatable, for a user. Segmentation of medical images is usually required in the field of radiotherapy treatment planning since target volumes (e.g. tumors) and "Organs at Risk" (OARs) must be defined and outlined in the images in order to facilitate planning of a treatment using a Treatment Planning System (TPS).

Structures can be manually segmented in the images using various tools, such as tools for drawing contours in CT slices. However, such manual segmentation is cumbersome and time-consuming. Especially in the field of adaptive radiotherapy, where the shape and/or position of structures may have to be adjusted during the course of the treatment, the segmentation of ROIs might constitute a major part of a treatment planning process. Therefore, many automatic or semi-automatic methods for segmenting ROIs in medical images have been proposed. Some of these are based on the use of templates or "atlases" comprising medical images with already segmented structures (e.g. internal organs). The structures are transferred into the new, and not yet segmented, medical image of a subject (hereinafter denoted "patient image" in contrast to an "atlas image") and adapted to the new geometry. These methods are often referred to as "atlas-based segmentation". An advantage of such methods is that the work previously done segmenting the atlas image is re-utilized when segmenting the patient image.

The results of a segmentation using atlas-based segmentation depend on the similarity between the used atlas image and the patient image. Obviously, also other parameters, such as the image registration algorithm used, are relevant. In general, though, it is hard to obtain a satisfactory result if the geometry of the atlas image differs too much from the geometry of the patient image. Various approaches have been suggested to address the problem of geometrical differences between an atlas image and a patient image.

One approach is to register multiple different atlases with the patient image and select the one that yields the best match for segmentation. For example, all available atlases may be deformably registered with the patient image and the atlas of which the registration indicates the highest degree of similarity (e.g. the highest correlation coefficient, mutual information value etc.) is selected and used for segmenting ROIs in the patient image by employing the deformable registration. Deformably registering each atlas with the patient image is a very time-consuming process requiring substantial computer processing power. Furthermore, the use of a single atlas for segmenting all regions of interest in an image might not always be optimal.

Another approach is to use the results from all of the atlas registrations and separately propagate all variants of the structures into the patient image and create averaged structures from the plurality of segmentations. When combining the segmentations, different segmentations are sometimes weighted differently based on various criteria. However, also such methods require that each atlas is deformably registered with the patient image.

A somewhat different approach is to create an average atlas of a plurality of atlases and deformably register the average atlas with the patient image. No selection of the most similar atlas is done, and this approach will often yield unsatisfactory results since the atlas will not be patient specific.

Furthermore, in many atlas-based segmentation methods previously used, substantial atlas pre-processing is required. For example, depending on the method used, a large number of landmarks must often be defined in the atlases.

An aim of the present invention is to overcome or at least mitigate the problems above and achieve atlas-based segmentation which is both accurate and fast, i.e. computationally cheap, and provide for effective selection amongst a large set of atlases.

SUMMARY

According to one aspect of the invention, a method for segmenting a patient image based on an atlas is provided. Preferably, the method includes:
  performing at least a first and a second rigid registration using a registration method allowing rigid transformations wherein the patient image is registered with at least a first and a second atlas image, respectively, said atlas images being acquired from different atlases comprising one or more segmented regions of interest, said rigid registrations resulting in a rigid registration result for each of the atlas images;
  determining a degree of similarity for each of the atlas images based on said rigid registration results;
  selecting an atlas on basis of the determined degree of similarity for each of the atlas images;
  performing a deformable registration using a registration method allowing non-rigid transformations wherein the patient image is registered with the atlas image of said selected atlas using said rigid registration result for the atlas image of said selected atlas as initialization, said deformable registration resulting in a deformable registration result;
  segmenting at least one region of interest in the patient image at least partly based on said deformable registration result.

According to another aspect of the invention, a computer program is provided. Preferably, the computer program comprises computer-readable instructions which, when executed on a computer, will cause the computer to perform the method for segmenting a patient image.

According to yet another aspect of the invention, a computer system is provided. Preferably, the computer system comprises a processor and at least one memory having stored thereon the computer program comprising the computer-readable instructions for segmenting a patient image, wherein the processor is coupled to the memory and configured to execute the computer-readable instructions.

By selecting the best matching atlas based on a rigid registration algorithm, a selection amongst a large set of atlases can be made effectively at a low computational cost. Furthermore, by using the result of the rigid registration as initialization for the subsequent deformable registration, the accuracy of the deformable registration will be improved.

According to some embodiments, each rigid registration comprises an initializing rigid registration considering the complete atlas image and a subsequent locally focused rigid registration only considering one or more predefined focus regions of the atlas image, where the result of said initializing rigid registration is used as initialization of said locally focused rigid registration. Accordingly, the initializing registration based on the whole atlas image will yield an initialization for image registration focusing on specific focus regions. Thereby, the result of the rigid registration (which will be the basis for atlas selection) depends primarily on the similarity in regions which are of particular interest for the segmentation, and the analysis is not affected by regions of less relevance.

According to some embodiments, the atlas images are sub-atlas images comprising one or more corresponding regions of interest, said sub-atlas images being sub-sets of, and derived from, different complete atlas images. The use of sub-atlas registration will ensure that the most appropriate atlas is selected for segmenting a certain ROI, even if the atlas is not suitable for segmenting other structures in the patient image.

According to some embodiments, each rigid registration of the patient image with each of the sub-atlas images comprises multiple consecutive registrations where the size of the sub-atlas image is reduced before each subsequent registration. Thus, a final sub-atlas registration (used for atlas selection and deformable registration) will not be affected by surrounding, less relevant, image information, and the method will therefore be both accurate and robust (by initially using a large sub-atlas).

According to some embodiments, a preparatory registration for each of one or more of said atlases is performed prior to performing said rigid registrations of the patient image with a sub-atlas image. The preparatory registration is performed using a registration method allowing rigid transformations wherein the patient image is registered with a complete atlas image acquired from the atlas, resulting in a preparatory registration result for said complete atlas image. The preparatory registration result is used as initialization for at least one of said rigid registrations of the patient image with a sub-atlas image derived from said complete atlas image. Thus, using the approximate sub-atlas positions already available from the registration of the corresponding complete atlas image, accurate sub-atlas registration can be achieved without the need of user input for indicating approximate sub-atlas positions.

According to some embodiments, each preparatory registration comprises an initializing rigid registration considering the complete atlas image and a subsequent locally focused rigid registration only considering one or more predefined focus regions of the atlas image, where the result of said initializing rigid registration is used as initialization of said locally focused rigid registration. Accordingly, the initializing registration based on the whole atlas image will yield an initialization for image registration focusing on specific focus regions. Thereby, the result of the preparatory registration (which will be the basis for atlas selection for a global deformable registration and used for initializing both the global deformable registration and sub-atlas rigid registrations) is determined by the similarity in regions which are of particular interest for the segmentation, and the analysis is not affected by regions of less relevance.

According to some embodiments, deformable registration is performed for registering the patient image with one of said complete atlas images, resulting in a global deformable registration result, and also for registering the patient image with at least one of said sub-atlas images, resulting in at least one local deformable registration result. One or more first regions of interest are segmented using the global deformable registration result and one or more second regions of interest are segmented using a local deformable registration result. Hence, by employing either a global registration result or local registration results for segmentation, the most appropriate method for specific ROIs can be used.

According to some embodiments, the selection of segmentation method (global or local) for a ROI is based on user input and/or information stored in connection with a template and/or an atlas and/or a ROI in an atlas.

According to some embodiments, the deformable registration comprises an initializing deformable registration considering the complete atlas image and a subsequent locally focused deformable registration only considering one or more predefined focus regions of the atlas image, where the result of said initializing deformable registration is used as initialization of said locally focused deformable registration. Thereby, the result of the deformable registration (which will be used for segmentation) is determined by the similarity in regions which are of particular interest for the segmentation, and the analysis is not affected by regions of less relevance.

According to some embodiments, at least one of said rigid registrations comprises registering an atlas image with the patient image employing a point-based registration algorithm using ROI-specific points of the atlas image and locations in the patient image of corresponding ROI-specific points of an already registered atlas image. By using point-based rigid registration for a sub-set of the atlas images, the computation time of the rigid registrations can be reduced since the point-based rigid registration is less computationally demanding.

According to some embodiments, the computer system comprises a processor adapted for parallel processing, such as a graphics processing unit, and the computer-readable instructions of the computer program are configured for being executed on such processor. Thereby, the computation time could be further reduced.

Further aspects of the invention will become apparent by consideration of the detailed description and accompanying drawings. These are only for purposes of illustrating preferred embodiments and are not to be construed as limiting the invention.

DETAILED DESCRIPTION

In all the figures referred to, two-dimensional cross sections of atlas- and patient images (i.e. representations of single slices of CT scans) are shown. This is merely for illustration purposes and for facilitating understanding of the invention, and it is emphasized that atlas- and patient images usually comprise many slices defining three-dimensional representations of subjects.

As used herein, a "template" refers to a collection of multiple atlases, often of a specific treatment site. Hence, a template contains a plurality of atlases. Each atlas comprises an internal image of some part of a subject, for example a CT scan of a previously treated patient, and a set of segmented structures corresponding to Regions of Interest (ROIs) in the image. An atlas may also contain other information relevant for atlas-based segmentation.

The internal image in the atlas, or a specified part of the internal image, is referred to as an "atlas image". Hence, an atlas image can refer either to a "complete atlas image" or to a "sub-atlas image" which corresponds to a specific part of the internal image in the atlas, containing at least one ROI.

Accordingly, a "sub-atlas" refers to a specific region of the internal image and a corresponding sub-set of the ROI segmentations.

Figure 1:
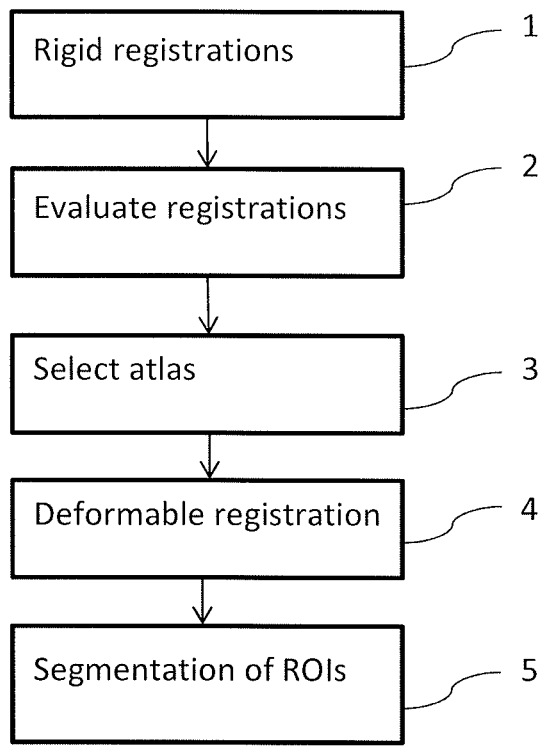
FIG. 1 is a flowchart of a method according to the invention.

FIG. 1 illustrates a flowchart showing the various method steps according to an embodiment of the invention.

In step 1, the patient image is rigidly registered with each of a plurality of atlas images in a template. An atlas image can be a complete internal image of an atlas comprising all the defined ROIs, or any part of a complete atlas image, referred to as a sub-atlas image. Such a sub-atlas image can for example comprise a region corresponding to a single ROI and the immediate surroundings of the ROI.

In step 2, a degree of similarity between each atlas image and the patient image is determined based on the results of the registrations, e.g. by evaluating a similarity measure resulting from the registration as described more in detail below with reference to FIG. 2.

In step 3, the atlas image of which the registration indicates the highest degree of similarity is selected.

In step 4, the selected atlas image is registered with the patient image using a registration algorithm allowing non-rigid transformations, i.e. deformable registration. The result of the rigid registration, as determined in step 1, of the selected atlas image is used as initialization for the deformable registration. Thereby, the deformable registration will commence from an approximate initial registration which will increase the chances of obtaining an accurate deformable registration.

In step 5, ROIs in the patient image are segmented in accordance with the deformable registrations.

Figure 2:
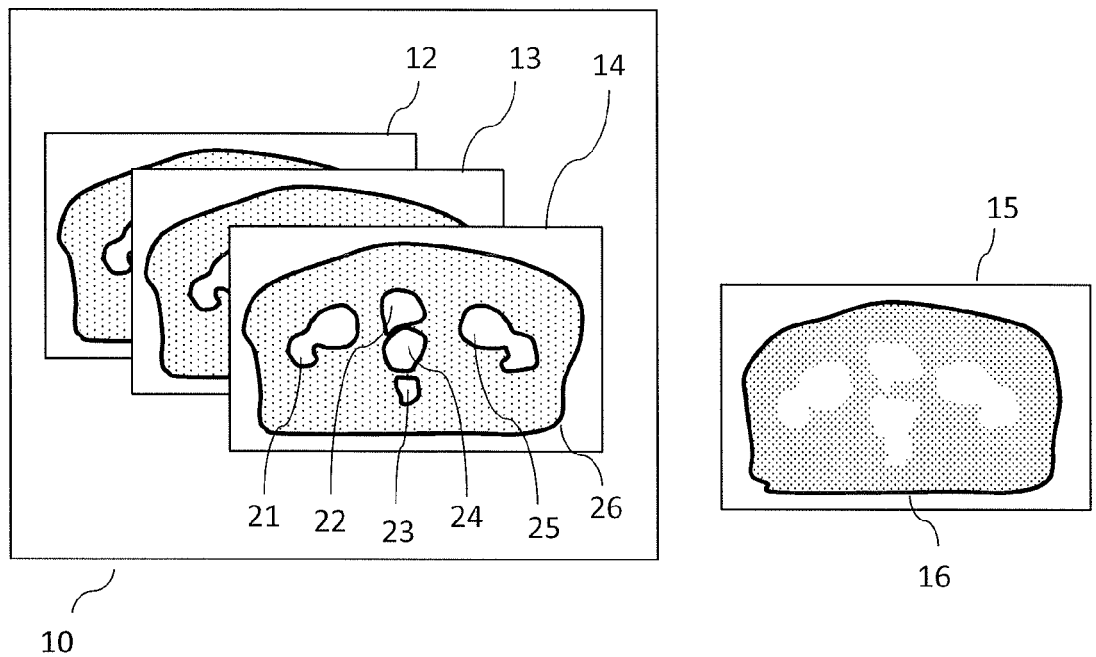
FIG. 2 is a schematic illustration of a template containing a plurality of atlases and a patient image to be segmented.

FIG. 2 shows an example of a template 10 containing a plurality of pelvic atlases 12-14, each atlas comprising CT image data and a set of segmented ROIs 21-25 (corresponding to left femoral head 21, bladder 22, rectum 23, prostate 24 and right femoral head 25) within the pelvic area. Also the external outline 26 is segmented in each atlas.

A patient image 15 is to be segmented using one of the atlases 12-14. Preferably, prior to image registration, the patient external outline 16 is determined in the patient image using an automatic segmentation method employing analysis of the image data. It is often easy to detect a body outline using such methods due to a high contrast between the body interior and the exterior. Alternatively, the segmentation of the patient body outline can be done manually. Segmentation of the external outline is not required, but will improve the result of the subsequent rigid registration. Thereafter, each of the atlas images 12-14 are registered with the patient image using rigid registration, i.e. employing a registration algorithm allowing only linear transformations such as, for example, translations, rotations and scaling. The rigid registration employs an optimization algorithm for finding a set of transformations that maximizes the similarity between the transformed atlas image and the patient image, which may involve maximizing a correlation coefficient, mutual information, normalized mutual information or any other similarity measure. Various algorithms for rigid image registration are well-known in the art and will therefore not be further described herein.

A validation of each rigid registration might be performed. For example, if the position of a ROI resulting from a registration is completely outside the patient outline in the patient image, the registration can be deemed to be non-valid and the corresponding atlas is discarded. Every atlas of which all the ROIs resulting from the registration are at least partly within the patient outline is approved and evaluated in the subsequent process. In other embodiments, also non-approved atlases are considered in subsequent steps. This could be useful for example in embodiments where a sub-atlas approach is used, as described further below.

Figure 3:
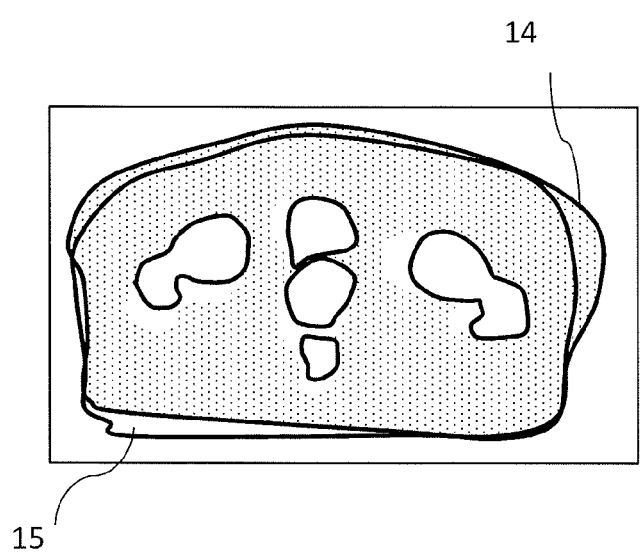
FIG. 3 is a schematic illustration of an atlas image rigidly registered with the patient image.

The atlas of which the rigid registration indicates the highest degree of similarity with the patient image is selected. For example, the atlas resulting in the highest objective function value of the optimization, e.g. the highest correlation coefficient, can be selected. If the patient image and the atlas image are of different modality, mutual information can be used as similarity measure. In this example, the registration of atlas image 14 resulted in the best match. FIG. 3 shows the atlas 14 aligned with the patient image 15, schematically indicating the result of the rigid registration.

The selected atlas image 14 is thereafter deformed to the patient image 15 employing a deformable registration algorithm. A deformable registration allows, in contrast to rigid registration, non-rigid transformation, and will result in a "displacement field", which basically is a vector field defining the displacements of elements in the image. One example of an algorithm sometimes employed for deformable registration is the demon's algorithm (Thirion, J. P. "Image matching as a diffusion process: an analogy with maxwell's demons", Medical Image Analysis 2(3), 243-260, 1998). Deformable registration is typically based on image information, such as intensity levels, or on structures/landmarks in the images, or on a combination thereof. Any deformable registration algorithm can be employed in the present invention. Various different algorithms for deformable image registration are well-known in the art and will therefore not be further described herein.

ROIs in the patient image are thereafter updated based on the resulting deformable registration. Thus, by applying the determined deformation to the segmented ROIs in the atlas, deformed ROIs can be obtained in the patient image, the deformed ROIs corresponding to the geometry of the patient image.

According to some embodiments, one or both of the rigid registration step (step 1 in FIG. 1) and the deformable registration step (step 4 in FIG. 1) comprise two separate registrations: a first initializing registration, and a subsequent, more locally focused, registration. This will be explained more in detail with reference to FIG. 5.

According to some embodiments, illustrated by FIGS. 4A-4E, an atlas image to be registered with the patient image represents only a part of a complete atlas image. This approach could be used instead of or in addition to, registering a complete atlas image with the patient image. When using a plurality of atlases, it is not likely that one single atlas will be most similar to the patient image with regard to all different ROIs. Therefore, different "sub-atlases" could be used for different regions. If a specific ROI is most effectively segmented using a certain atlas, whereas the atlas is inappropriate for segmenting other ROIs, a sub-atlas regarding a specific ROI might be used for segmenting only this ROI in the patient image. Thus, sub-atlases from different atlases might be used for segmenting different ROIs in the patient image.

A sub-atlas image represents a part of a complete atlas image and comprises a region corresponding to at least one ROI and a predetermined small region around the at least one ROI. As used herein, a "local registration" corresponds to a registration of a sub-atlas image with the patient image while a "global registration" corresponds to a registration of a complete atlas image with the patient image.

Figure 4A:
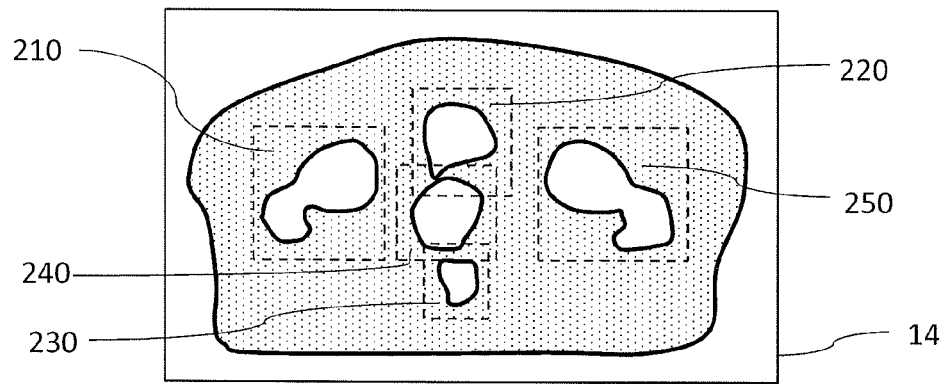
FIG. 4A is a schematic illustration of an atlas comprising a plurality of sub-atlases.

FIG. 4A shows the atlas 14 comprising the five ROIs 21-25. Based on these ROIs, a corresponding number of sub-atlases 210-250 are derived from the atlas 14. Binary masks corresponding to volume elements in the atlas image are used to define the sub-atlas regions. Each sub-atlas binary mask covers a region corresponding to a ROI and an additional small region around the ROI. The regions should be large enough for enabling satisfactory image based registration with a patient image, and subsequent segmentation of the ROI, as described elsewhere herein. A sub-atlas binary mask can be automatically defined by using a predetermined size of a region surrounding the ROI. In FIG. 4A, the sub-atlases 210-250 are defined by bounding boxes, but they could also be defined in other ways, such as, for example, so as to correspond to a uniform expansion of the ROI. Alternatively, the region could have different extension in different directions from the ROI. Sub-atlases could be derived from the atlas during an atlas-based segmentation, or they could be pre-defined in the atlases. Alternatively or additionally, the characteristics of a sub-atlas might be defined or modified by a user who could be allowed to input information regarding a binary mask defining a sub-atlas. Sub-atlases for different ROIs are defined in a corresponding way in all of the atlases 12-14.

Figure 4B:
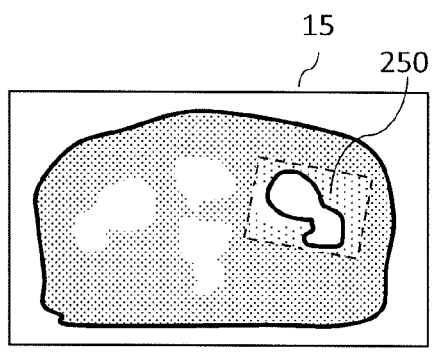
FIG. 4B illustrates the initialization of a sub-atlas as a result from an initial rigid registration.

FIG. 4B shows the sub-atlas image 250, corresponding to the right femoral head 25, aligned with the patient image in accordance with the result of a "preparatory" rigid registration of the patient image with the complete atlas image 14, e.g. in accordance with a registration as illustrated in FIG. 3. Hence, the result of the preparatory registration is used for initializing the rigid registration of sub-atlas image 250 with patient image 15. More specifically, the preparatory registration result of a region corresponding to the sub-atlas 250 is used as approximate starting position for the subsequent rigid sub-atlas registration. The rigid registration of the sub-atlas image with the patient image can be based for example on the same algorithms as those described above in relation to FIG. 2.

Figure 4C:
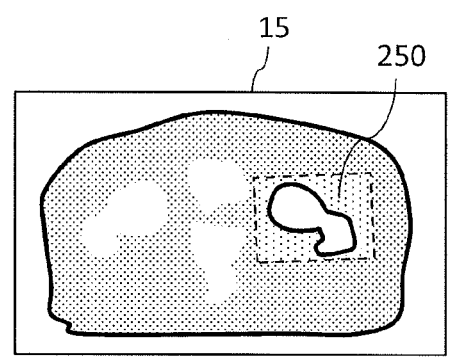
FIG. 4C illustrates the result of a subsequent rigid registration of the sub-atlas.

FIG. 4C illustrates the result of such "local" rigid registration of sub-atlas 250 with patient image 15. All sub-atlas images corresponding to the same ROI derived from all of the atlases 12-14 are rigidly registered with the patient image, using the respective preparatory rigid registration of the atlases 12-14 for initialization, producing a plurality of sub-atlas rigid registration results. A validation procedure, similar to the procedure described above in relation to FIG. 2, can be used for discarding sub-atlases not yielding acceptable results.

The most promising sub-atlas is automatically selected based on the results of the rigid registrations. The selection can be based on similar criteria as described above in relation to FIG. 2. In the illustrated example, the sub-atlas 250 of the atlas 14 is selected for the subsequent deformable registration.

The rigid registration of a sub-atlas as illustrated in FIG. 4C could comprise multiple consecutive registrations, where the size of a sub-atlas is reduced before each subsequent registration. For example, in the first step, a relatively large sub-atlas can be used, e.g. defined by a bounding box as illustrated in the figures. Using a large sub-atlas, it is ensured that enough context information is available for the image registration. In the next step, a sub-atlas defined by a less extensive binary mask is employed, where the result from the previous step is used as starting position. The reduced sub-atlas could be defined by a smaller bounding box or by a region corresponding to an expanded ROI or in any other way. Further registrations using even smaller sub-atlases could be performed, where the previous result is used as initialization. The result of a final rigid sub-atlas registration obtained thereby is used when evaluating which sub-atlas to use for the deformable registration. By using this method, the sub-atlas selection, and the subsequent deformable registration, is based on the smallest possible sub-atlas image from each atlas, i.e. an image where a minimum amount of the surroundings of the ROI influence the result.

Figure 4D:
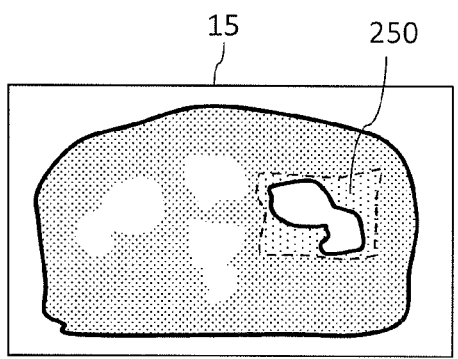
FIG. 4D illustrates the result of a subsequent deformable registration of the sub-atlas.
Figure 4E:
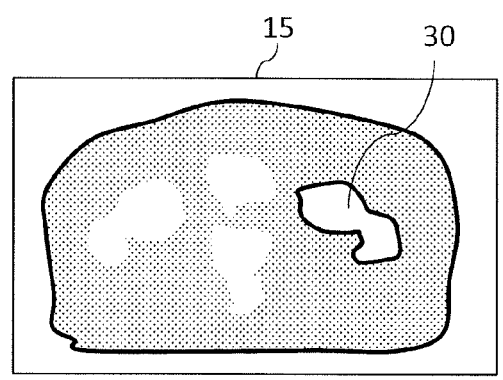
FIG. 4E illustrates the final segmented ROI in the patient image.

The deformable registration of the selected sub-atlas image with the patient image can for example be based on the same algorithms as those described above in relation to FIGS. 2-3. FIG. 4D illustrates the result of such "local" deformable registration of sub-atlas 250 with patient image 15. The ROI is updated in the patient image based on the deformable registration. FIG. 4E shows the patient image 15 with the updated ROI 30.

A local, sub-atlas based, registration of a ROI can sometimes yield an unsatisfactory result because some ROIs might need more context information than is provided by a sub-atlas. Hence, if local registration yields inadequate segmentation results for some ROIs, a global deformable registration of a complete atlas image with the patient image would preferably be used for segmenting such ROIs. Thus, according to some embodiments of the invention, certain ROIs are segmented using a global deformable registration while other ROIs are segmented using local deformable registrations. The segmentation method to use for a ROI might be pre-determined or selected by a user. Consequently, also when a sub-atlas approach is used for the atlas-based segmentation, a global deformable registration can be performed using the complete atlas image which during the preparatory rigid registration was determined to yield the best match.

Figure 5:
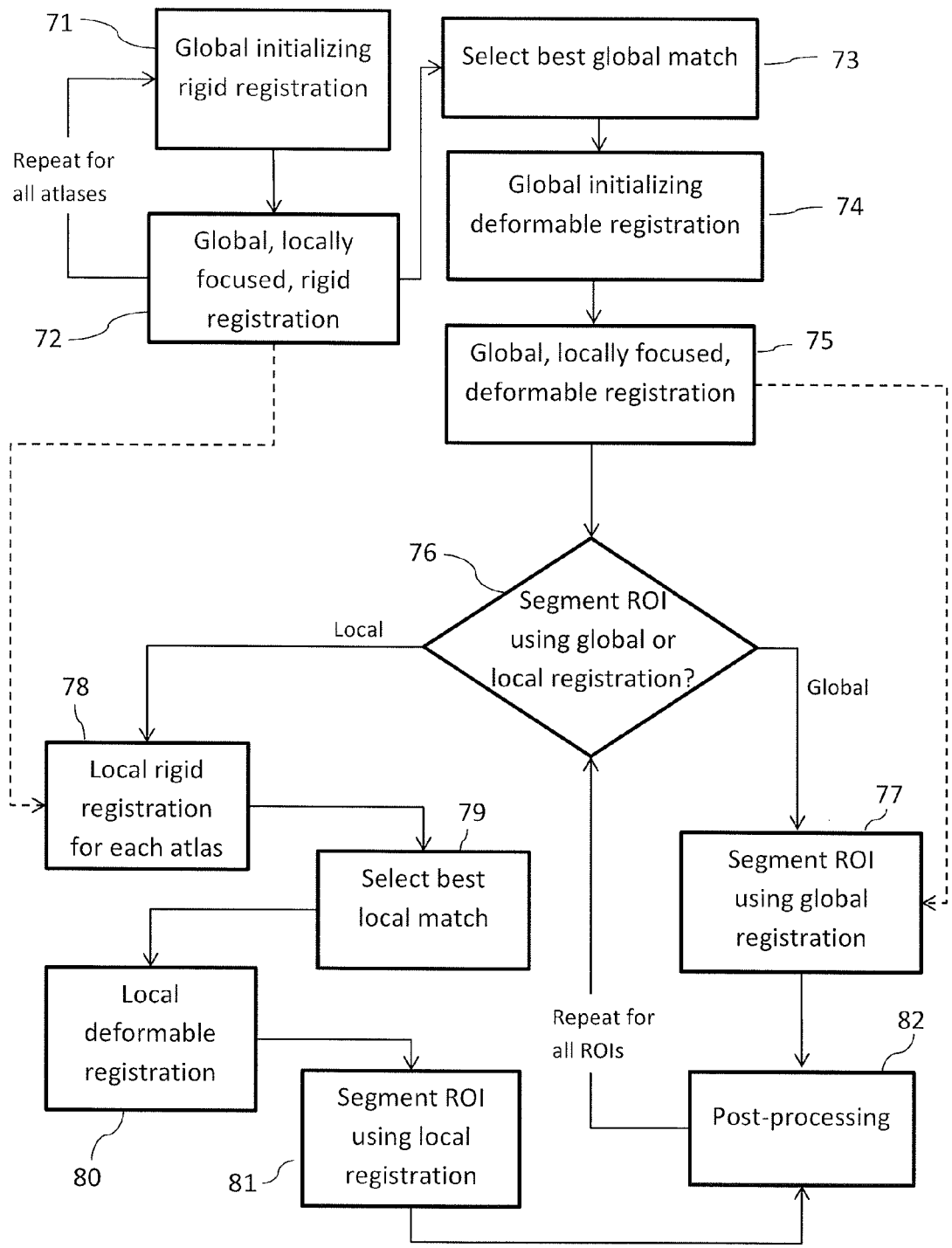
FIG. 5 is a flowchart showing an atlas-based segmentation method according to an example embodiment of the invention.

FIG. 5 shows an example embodiment of such an atlas-based segmentation method employing both local and global registrations. According to the example, each of the preparatory rigid registration and the global deformable registration comprise two separate registration steps: a first initializing registration, which is based on the whole image, and a subsequent locally focused registration. Hence, in step 71, a global initializing registration of the atlas image with the patient image is performed, using a rigid registration algorithm. As discussed earlier, to achieve an improved result of such registration, the outline of the patient might have been defined in the patient image prior to the registration. The result of the global initializing rigid registration gives a starting position for the subsequent, locally focused, rigid registration in step 72. The locally focused registration is a global registration (and should not to be confused with a local registration of sub-atlases) but aiming at registering only specific parts of the atlas with the patient image, the specific parts for example comprising all the ROIs in the atlas which are to be segmented. Thus, the locally focused registration disregards image information which is of less interest for the segmentation, and evaluates the image similarity only in the parts of interest. Accordingly, given the approximate starting position from step 71, the rigid registration algorithm tries to find the rigid transformations of the atlas image that maximizes the similarity in the predefined focus regions.

The steps 71 and 72 are repeated for a plurality of atlases (e.g. all atlases in a template).

If all ROIs are to be segmented using sub-atlases, the steps 73-76 could be omitted, and the method could proceed directly to step 78. If not, the atlas which produces the best match in step 72, (e.g. yielding the highest correlation coefficient) is selected in step 73. In step 74, the selected atlas image is registered with the patient image using deformable registration. This registration is used as initialization for a further deformable registration in step 75, where the registration is, similarly to the rigid registration in step 72, based only on the predefined focus regions of the atlas. Hence, a final global registration result of the selected atlas is achieved where the registration only focuses on the parts of the atlas image which are of interest (i.e. corresponding to all ROIs to be segmented).

In step 76 it is determined for each ROI which method to use for segmentation. If a ROI is to be segmented using a global registration, the method proceeds to step 77 where the displacement map determined in step 75 is employed (as indicated by the dashed line) to segment the ROI in the patient image.

For a ROI which in step 76 is determined to be segmented using local registration, the method proceeds to step 78 where a local rigid registration process is performed. Here, a plurality of sub-atlas images corresponding to a region containing the ROI to be segmented, and derived from each of the atlases, are registered with the patient image using the respective rigid registration result from step 72 as initialization (as indicated by the dashed line). As explained above with reference to FIG. 4C, each sub-atlas registration could comprise multiple consecutive registrations where the size of the sub-atlas image is reduced before each registration. In step 79, the best matching sub-atlas is selected. Since only a part of a complete atlas image is registered to the corresponding part of the patient image, the best matching sub-atlas does not necessarily originate from the atlas which was globally most similar to the patient image (as selected in step 73). In step 80, the selected sub-atlas image is deformably registered with the patient image. The resulting displacement field is used for segmenting the ROI in step 81.

If needed, the segmentation of a ROI could optionally be refined in step 82 using any kind of automatic or manual post-processing. The segmentation process, using either a local registration or the global registration, is repeated for each ROI which is to be segmented. Hence, the method illustrated in FIG. 5 will result in a plurality of ROIs being automatically segmented in the patient image.

A ROI of an atlas image can be represented by contours, voxels (volume elements), meshes, or by any other means suitable for atlas-based segmentation. Different representations can be used for different ROIs in the same atlas. If, for example, a ROI is represented as a mesh used for model-based segmentation (MBS), a MBS-refinement of the atlas-based segmentation is an example of post-processing which can be automatically performed in step 82 of FIG. 5. MBS utilizes mesh-based shape models, constructed from a plurality of manually contoured structures, where each shape model consists of an average model and shape components defining the most typical shape variations of the modeled structure. After being initialized, the model is adapted to the geometry of the patient image using image information and the underlying shape model.

More specifically, image feature points are extracted for each vertex of the model by searching in the normal direction of the vertex. The adaptation algorithm then tries to match the model to the feature points without violating the shape constraints given by the model. In order to obtain a satisfactory result using model based segmentation, a good initial position of the ROI is usually required. Therefore, in the context of the present invention, the position and shape of an atlas-segmented ROI can be used for initialization of model-based segmentation.

Various methods for pre-processing of the atlas- and/or patient image can also be performed in connection with the segmentation procedure shown in FIG. 5 in order to further improve the segmentation results. Pre-processing methods which are specific for a certain ROI type (e.g. for a specific organ) might be used. For example, if a ROI in an atlas defines a rectum (e.g. if the ROI is tagged accordingly in the atlas), image processing methods for hole filling could be automatically applied. Using such methods, regions corresponding to rectal gas are identified in the images and "filled" employing image data of nearby regions. The subsequent image registration will be more accurate since regions of rectal gas will not influence the registration result. Pre-processing steps could be employed prior to any of the various registration steps indicated in FIG. 5. A hole filling procedure as described above could for example be performed prior to the local rigid registrations in step 78. Image pre-processing for hole filling, as well as other kinds of image pre-processing, is possible for various kinds of ROIs, irrespective of how they are represented in the atlas (e.g. by contours, voxels, MBS model etc.).

The choice of segmentation method for different ROIs might be predetermined. Thus, information regarding which ROIs to segment using local registrations and which ROIs to segment using the global registration can be stored in connection with the template or atlas. Alternatively or additionally, a user interface, e.g. a graphical user interface, can allow a user to select for each ROI which method to use, or to change a pre-defined selection for any ROI.

ROIs which are easily discernible might be segmented using sub-atlases while structures which require more context information (e.g. location in relation to surrounding ROIs) in order to be segmented correctly might be segmented using the global registration. As an example relating to segmentation in the male pelvic area, the femoral heads and the bladder could be segmented using sub-atlas registration while the prostate and rectum could be segmented using a global registration. In the head/neck area, the mandible, spinal cord and brain might be segmented using sub-atlas registration while other ROIs, such as the parotid glands, could be segmented using a global registration. These are merely examples and other selections regarding which methods to use for different ROIs are possible.

The atlases of a template can be specific for a certain treatment area, such as pelvic or head/neck. Templates could be even more specific, for example containing atlases limited to specific genders, ages and/or body constitutions. Thus, a template may for example contain only pelvic atlases of male subjects having a body weight within a specific range. Alternatively, a comprehensive template comprising atlases of any kind could be used. Such template could be advantageous in some situations, for example if atlas-based segmentation is initialized directly after acquiring a patient image, since no further information regarding the patient image, such as treatment site, would be required. Hence, for example, if the patient image relates to a head and neck case, the best matching head and neck atlas in a comprehensive template will be found and selected, irrespective of if atlases of other treatment sites are present in the template. If a sufficiently effective method is used for selecting the best atlas, a fast atlas-based segmentation can be achieved even if a large number of atlases are evaluated.

An alternative method could be to initially register the patient image with a few atlas images of different kinds (e.g. of different treatment sites) selected from a single template or from different templates, and based on the result automatically determine the kind of treatment image. Hence, the subsequent steps of the atlas selection process could be limited to the kind of atlases determined thereby.

Preferably, each atlas in a template has a corresponding set of segmented ROIs. However, using the sub-atlas approach, this is not necessarily a requirement since not all ROIs have to be segmented from the same atlas. Thus, if an atlas is employed for segmenting a single ROI using a sub-atlas, other ROIs do not have to be segmented in the atlas.

A user might be allowed to create new templates and add or remove atlases to and from already existing templates. Thereby, a template can be customized in accordance with specific user requirements. Since no (or little) pre-processing of new atlases is needed, and since not all ROIs must necessarily be defined in all atlases, it is easy to create comprehensive templates, which more likely will result in accurate segmentations.

Figure 6:
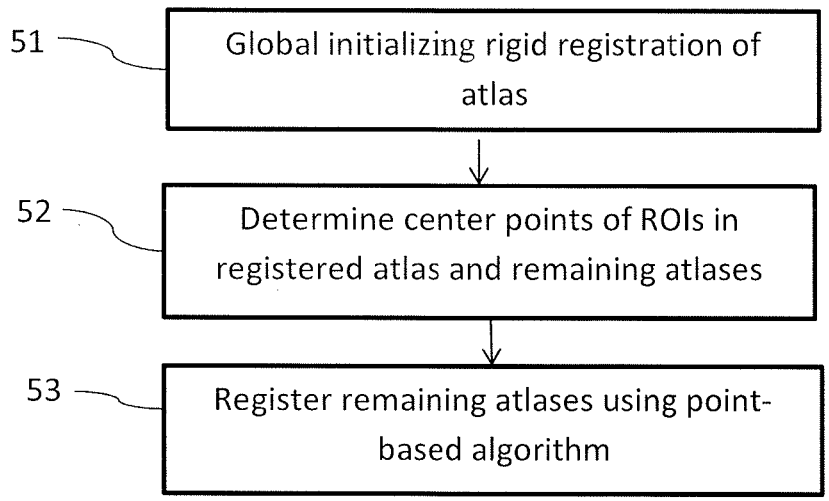
FIG. 6 is a flowchart showing a method for achieving computationally efficient initializing rigid registrations.
Figure 7:
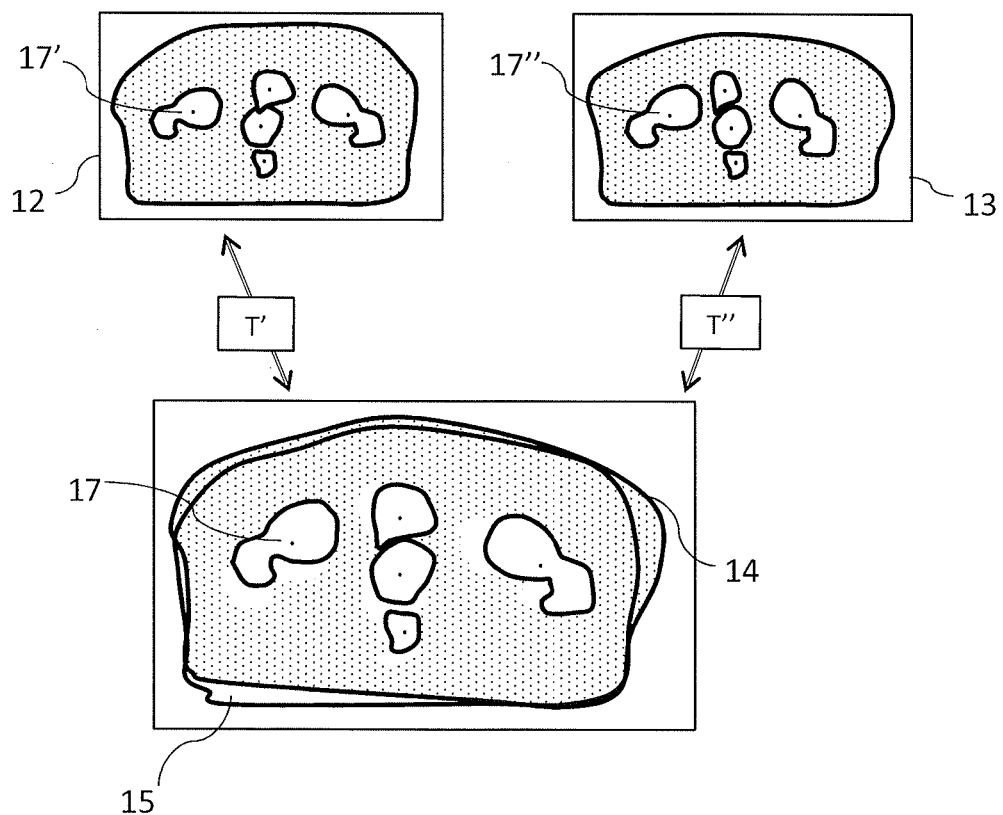
FIG. 7 is a schematic illustration of a registration method according to FIG. 6.

If a comprehensive template with many atlases is used, the initial rigid registration of each atlas with the patient image, for example the global initializing registrations of step 71 in FIG. 5, can be time-consuming. According to some embodiments of the invention, a sub-set of the registrations are point-based in order to reduce the processing time. This is described with reference to FIGS. 6 and 7, illustrating a method for performing global initializing registrations.

First, in step 51, the atlas 14 is rigidly registered with the patient image 15 using image based registration as described previously. If the result of the registration is deemed to be good enough, e.g. if all the ROIs are located within the patient outline and the correlation coefficient exceeds some predetermined threshold indicating a sufficiently good match, the registration result can be employed when registering the remaining atlases.

In step 52, the center points, i.e. points corresponding to the centroids of the ROIs in atlas 14 as well as in the remaining atlases 12 and 13, are determined. Alternatively, the ROI center points might be pre-stored in the atlases. Center points of all or a sub-set of the ROIs can be determined and used in the subsequent registration. Instead of using ROI center points, other ROI-specific points could be employed, as long as the corresponding points are well-defined or easily determinable in all the corresponding ROIs in the atlases.

In step 53, the remaining atlases 12, 13 (i.e. the atlases for which an initializing registration have not yet been performed) are rigidly registered with the patient image 15 using point-based registration where the locations in patient image 15 of the ROI center points of the registered atlas 14 are matched with corresponding center points of ROIs in atlases 12 and 13. As exemplified in FIG. 7, the center point 17 of the left femoral head from atlas 14, as registered with the patient image, is matched to center point 17' of the left femoral head in atlas 12 when rigidly registering atlas 12 to patient image 15. Correspondingly, center point 17 is matched to center point 17" in the atlas 13 when rigidly registering the atlas 13 with the patient image 15. Using a plurality of center points of corresponding ROIs (five in the illustrated example), initializing registrations, T' and T", of the atlas images 12 and 13 will be obtained without using image-based registration.

Thus, if the image-based initializing registration of atlas image 14 with patient image 15 was sufficiently good, the initializing registrations T' and T" are likely to yield adequate starting positions for the subsequent locally focused registration of the rigid registration step.

As mentioned above, the criteria for determining a sufficiently good match can be based on correlation coefficients of the image-based registrations. Hence, image-based initializing registrations can be carried out until an atlas resulting in a registration with a correlation coefficient above a pre-defined threshold is found. Thereafter, the remaining atlases are registered using the point-based approach as described above. Alternatively, a pre-determined number of atlases are registered with the patient image using image-based initializing registrations. From this set of registrations, the one resulting in the highest correlation coefficient is selected and used when performing the point-based registration of remaining atlases.

The described method for finding initializations for a plurality of atlases, where atlases are registered to a patient image based on ROI points both in an already registered atlas and in atlases not yet registered, could be used in connection with any suitable atlas-based segmentation method, and is not restricted to the methods described above with reference to FIGS. 1-7.

In an alternative embodiment, atlases in a template are pre-registered with each other. If a sufficiently good initialization registration of an atlas is found, initializations of all remaining atlases in the template could be immediately determined using the pre-registrations. Hence, an initialization registration of the patient image with an atlas image could be obtained by combining the result of an already performed atlas-to-patient registration with the result of a corresponding pre-calculated registration of the already registered atlas image with the atlas image which is to be registered. Accordingly, it would not be necessary to separately register every atlas image with the patient image.

Figure 8:
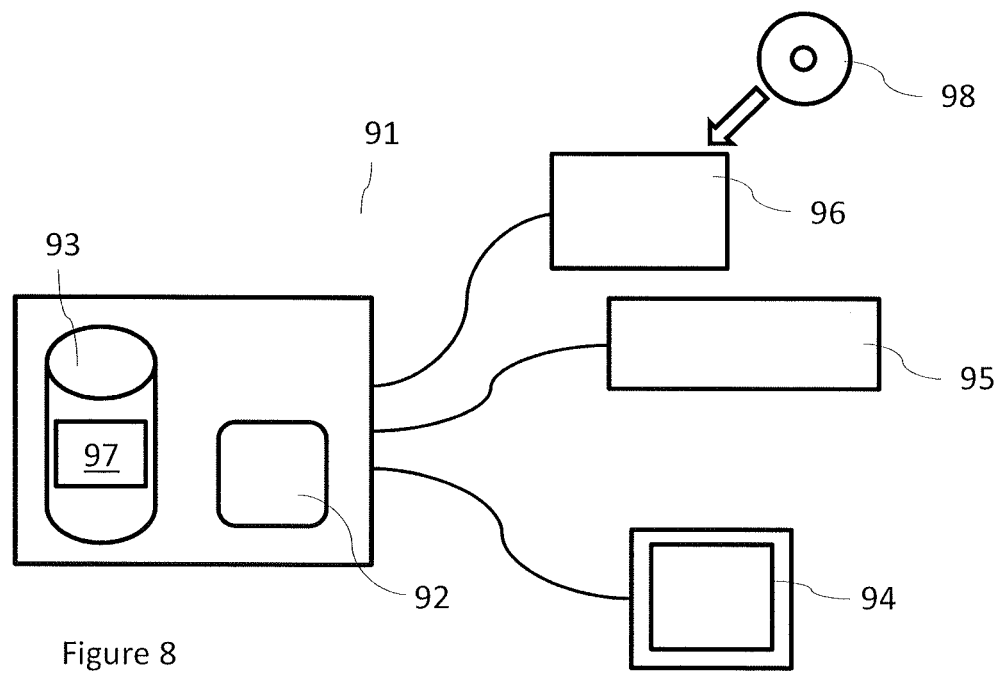
FIG. 8 is a schematic illustration of a computer system according to an example embodiment of the invention.

FIG. 8 schematically illustrates an example of a computer system 91 according to the invention. The system comprises a processor 92, coupled to a memory 93. Furthermore, the system can include a display device 94 (e.g. for displaying patient images, atlas images, various information relating to the atlas-based segmentation, a graphical user interface, etc.), a data input device 95 (e.g. a keyboard, a mouse or any other suitable device for data input) and a data reading/writing device 96 (e.g. an optical drive, USB interface, or any other suitable device for reading/writing data). The processor 92 can be of any kind, such as one or more central processing units (CPU) or any kind of parallel processor system, e.g.

based on one or more graphics processing units (GPU). The memory 93 can be any kind of volatile or non-volatile memory suitable for storing and retrieving information, such as, for example, a hard drive. The memory 93 has a computer program 97 stored thereon. The computer program 97 comprises computer-readable instructions for performing atlas-based segmentation, where the computer-readable instructions can be transferred to, and executed by, the processor 92. When executed by the processor 92, the computer-readable instructions will perform a method as illustrated in FIG. 1 for segmenting ROIs in a patient image. The segmented ROIs can be stored, together with the patient image, on the memory 93. The computer program 97 can also be stored on a non-transitory computer readable medium 98, e.g. a USB drive, an optical data carrier such as a CD-ROM, or any other suitable portable information storage device, so that the computer program 97 can be loaded to the memory 93 and/or transferred to different computing systems. The system described with reference to FIG. 8 is merely an example, and a computer system according to the invention does not necessarily comprise all the illustrated components, and/or might comprise other components not illustrated.

When using a comprehensive template with many atlases, a relatively large number of computations will be necessary. The computation time might be reduced if the computer-readable instructions of the computer program 97 are adapted for parallel computing and the processor 92 is suitable for parallel processing (e.g. being based on a multicore processor and/or a GPU).

The invention has been described with reference to a number of example embodiments. It is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method for segmenting a patient image based on an atlas, comprising the steps of, at a processor:
    performing, for each of at least two atlases, each comprising one or more segmented regions of interest, a preparatory registration using a registration method allowing rigid transformations wherein the patient image is registered with a complete atlas image acquired from the atlas, resulting in a preparatory registration result for said complete atlas image which is used as initialization for at least one of the following rigid registration steps;
    performing at least a first and a second rigid registration using a registration method allowing rigid transformations wherein the patient image is registered with at least a first and a second sub-atlas image, respectively, said sub-atlas images being sub-sets of, and derived from, different complete atlas images comprising one or more segmented regions of interest, wherein each of said rigid registrations of the patient image with each of said sub-atlas images comprises multiple consecutive registrations where the size of the sub-atlas image is reduced before each subsequent registration, said rigid registrations resulting in a rigid registration result for each of the atlas images;
    determining a degree of similarity for each of the sub-atlas images based on said rigid registration results;
    selecting an atlas on basis of the determined degree of similarity for each of the sub-atlas images;
    performing a deformable registration using a registration method allowing non-rigid transformations wherein the patient image is registered with the sub-atlas image of said selected atlas using said rigid registration result for the sub-atlas image of said selected atlas as initialization, said deformable registration resulting in a deformable registration result; and
    segmenting at least one region of interest in the patient image at least partly based on said deformable registration result.

2. The method according to claim 1, wherein at least one of said rigid registrations comprises:
    an initializing rigid registration considering the complete atlas image; and
    a locally focused rigid registration only considering one or more predefined focus regions of the atlas image,
    where the result of said initializing rigid registration is used as initialization of said locally focused rigid registration.

3. The method according to claim 1, wherein at least one of said preparatory registrations comprises:
    an initializing rigid registration, considering the complete atlas image; and
    a locally focused rigid registration, only considering one or more predefined focus regions of the complete atlas image,
    where the result of said initializing rigid registration is used as initialization of said locally focused rigid registration.

4. The method according to claim 1, wherein said deformable registration is performed for registering the patient image with one of said complete atlas images, resulting in a global deformable registration result, and for registering the patient image with at least one of said sub-atlas images, resulting in at least one local deformable registration result, and wherein one or more first regions of interest are segmented using said global deformable registration result and one or more second regions of interest are segmented using one or more of said at least one local deformable registration result.

5. The method according to claim 4, wherein at least one of said one or more first regions of interest and said one or more second regions of interest are selected on basis of one or more of:
    user input; and
    information stored in connection with at least one of a template, an atlas, and a region of interest in an atlas.

6. The method according to claim 1, wherein said deformable registration comprises:
    an initializing deformable registration considering the complete atlas image; and
    a locally focused deformable registration considering only one or more predefined focus regions of the complete atlas image,
    where the result of said initializing deformable registration is used for initialization of said locally focused deformable registration.

7. The method according to claim 1, wherein at least one of said rigid registrations comprises registering an atlas image with the patient image employing a point-based registration algorithm using ROI-specific points of the atlas image and locations in the patient image of corresponding ROI-specific points of an already registered atlas image.

8. A computer program, stored in a non-transitory computer-readable medium, comprising computer-readable instructions which, when executed on a computer, will cause the computer to perform a method according to claim 1.

9. The computer program according to claim 8, wherein the computer-readable instructions are configured for being executed on a processor adapted for parallel processing on a computer.

10. The computer program according to claim 9, wherein the processor is a graphics processing unit.

11. A computer system comprising a processor and at least one memory having the computer program according to claim 8 stored thereon, wherein the processor is coupled to the memory and configured to execute the computer-readable instructions of the computer program.

12. The computer system according to claim 11, wherein the processor is a processor adapted for parallel processing.

13. The computer system according to claim 12, wherein the processor is a graphics processing unit.

* * * * *